April 6, 1926.
G. L. NICHOLS ET AL
MANURE SPREADER
Filed June 11. 1924
1,579,831
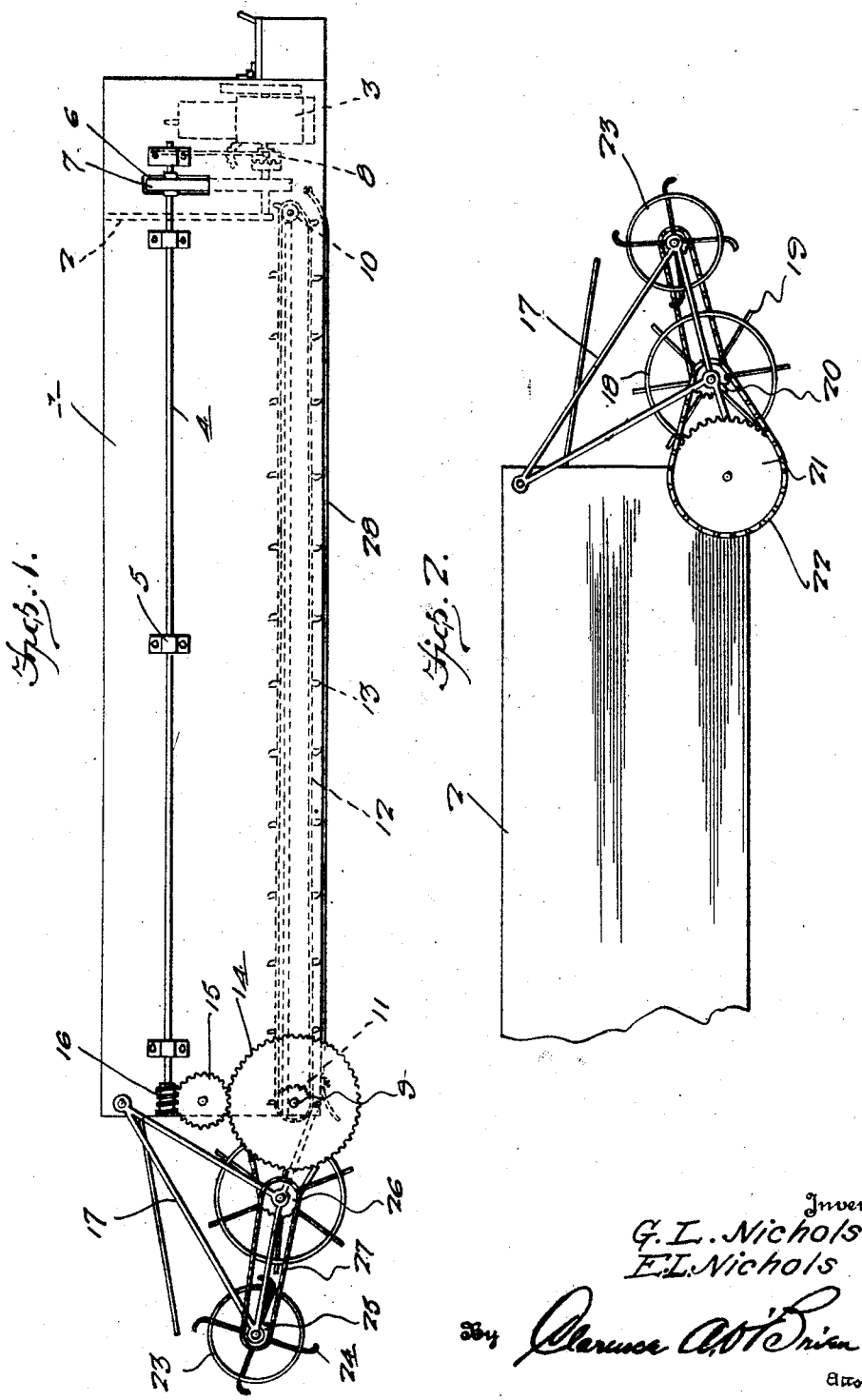

Patented Apr. 6, 1926.

1,579,831

UNITED STATES PATENT OFFICE.

GIDEON L. NICHOLS AND EDWARD L. NICHOLS, OF BLOOMVILLE, NEW YORK.

MANURE SPREADER.

Application filed June 11, 1924. Serial No. 719,379.

*To all whom it may concern:*

Be it known that we, GIDEON L. NICHOLS and EDWARD L. NICHOLS, citizens of the United States, residing at Bloomville, in the county of Delaware and State of New York, have invented certain new and useful Improvements in Manure Spreaders, of which the following is a specification.

This invention relates to manure spreaders, and it consists in the novel features hereinafter described and claimed.

An object of the invention is to provide a manure spreader of simple and durable structure, adapted to be mounted upon the running gear of a wagon or other vehicle, and which includes a body having a belt mounted for movement longitudinally of the bottom thereof. An engine is mounted upon the body and is operatively connected with the belt for moving the same. Further, drums are journaled for rotation at the rear end of the body and are adapted to receive the manure from the belt and distribute the same upon the surface of the soil. The said drums are operatively connected together, and operatively connected with the belt.

In the accompanying drawing:

Figure 1 is a side elevation of the manure spreader.

Figure 2 is an enlarged rear end elevation of the manure spreader, looking at the side thereof, opposite that side which is illustrated in Figure 1.

The manure spreader comprises a body 1, adapted to be mounted upon the running gear of a wagon, in the usual manner. Said body 1 is provided in the vicinity of its forward end with a partition 2, forming a compartment at the forward portion of the body, in which is located a gas engine 3. A shaft 4 is journaled in bearings 5, which are mounted at the side of the body 1, and the said shaft carries a pulley wheel 6, around which a belt 7 is threaded. Said belt is also trained around the shaft of the engine 3. Therefore means is provided for transmitting rotary movement from the engine 3 to the shaft 4. A clutch mechanism 8 is mounted upon the shaft of the engine 3 and may be used in the usual manner, for interrupting the rotary movement of the engine shaft to the shaft 4.

A shaft 9 is journaled at the rear end of the body 1 and a roller 10 is journaled at the forward portion of the said body. A roller 11 is mounted at the forward portion of the said body. A roller 11 is mounted upon the shaft 9, and said roller 11 is of greater diameter than the roller 10. A belt 12 is trained around the rollers 10 and 11, and is provided with a series of cross slots 13. The upper end of the belt 12 is arranged to move along the bottom of the body 1, and the lower run of the belt 12 moves along under the bottom of the said body. A relatively large gear wheel 14 is fixed to one end of the shaft 9 and meshes with the worm wheel 15, which is journaled at the side of the body 1. A worm 16 is carried at the rear end of the shaft 4 and meshes with the worm wheel 15. Therefore, it will be seen that as the shaft 4 rotates, rotary movement is transmitted through the worm wheel 15, the wheel 14 to the shaft 9, and therefore the belt 12 is moved along the bottom of the body 1. Brackets 17 are carried at the rear end of the body 1, and a drum 18 is journaled in the said bracket and is disposed transversely across the rear end of the body 1. The drum 18 is provided upon its periphery with a series of radially disposed fingers 19. A sprocket 20 is fixed to one end of the shaft of the drum 18, and a sprocket wheel 21 is fixed to the end of the shaft 9, opposite that end at which the wheel is mounted. A sprocket chain 22 is trained around the sprocket wheels 20 and 21, and is adapted to transmit rotary movement from the shaft 9 to the drum 18. A drum 23 is journaled for rotation at the rear ends of the brackets 17, and is provided at its periphery with a series of fingers 24. A sprocket wheel 25 is mounted upon the shaft of the drum 23, and a sprocket wheel 26 is mounted upon the shaft of the drum 18. A sprocket chain 27 is trained around the sprocket wheels 25 and 26, and is adapted to transmit rotary movement from the drum 18 to the drum 23.

Therefore, as the manure is carried rearwardly by the upper run of the belt 23, it is first deposited upon the drum 18 and is carried over the turning movement of the said drum and encountered by the projecting pin 24 of the drum 23 and is scattered over the said drum 23 upon the surface of the soil.

Rods 28 are located under the lower run of the belt 12 and prevent the belt from sagging and catching in the running gear and bolsters of the wagon to which the spreader is applied.

Having described the invention, what is claimed is:

A manure spreader including in combination, a body, a pair of triangular-shaped frames fixed to the rear of the body, one on each side thereof, the upper apexes of the frames being attached to the sides of the body, a pair of distributing drums journaled in the other apexes of the frame, bracing means extending from the lower apexes of the frames to the body, said frames being disposed so that the rear drum has its axis above the axis of the front drum.

In testimony whereof we affix our signatures.

GIDEON L. NICHOLS.
EDWARD L. NICHOLS.